United States Patent
Hanko et al.

(10) Patent No.: US 11,308,795 B2
(45) Date of Patent: Apr. 19, 2022

(54) SENSOR SYSTEM FOR MOBILE ACQUISITION OF AT LEAST ONE MEASURED VALUE AND MEASURING METHOD FOR SUCH A SENSOR SYSTEM

(71) Applicant: Endress+Hauser Conducta GmbH+Co. KG, Gerlingen (DE)

(72) Inventors: Michael Hanko, Dresden (DE); Stefan Pilz, Geithain (DE); Björn Haase, Stuttgart (DE); Andreas Löbbert, Waldheim (DE)

(73) Assignee: Endress+Hauser Conducta GmbH+Co. KG, Gedingen (DE)

( * ) Notice: Subject to any disclaimer, the term of this patent is extended or adjusted under 35 U.S.C. 154(b) by 0 days.

(21) Appl. No.: 17/066,669

(22) Filed: Oct. 9, 2020

(65) Prior Publication Data

US 2021/0110704 A1  Apr. 15, 2021

(30) Foreign Application Priority Data

Oct. 10, 2019 (DE) ...................... 10 2019 127 380.3

(51) Int. Cl.
| | |
|---|---|
| G08C 17/02 | (2006.01) |
| G01D 21/02 | (2006.01) |
| H04B 10/00 | (2013.01) |
| H04B 11/00 | (2006.01) |

(52) U.S. Cl.
CPC ............. *G08C 17/02* (2013.01); *G01D 21/02* (2013.01); *H04B 10/00* (2013.01); *H04B 11/00* (2013.01)

(58) Field of Classification Search
CPC ........ G08C 17/02; G01D 21/02; H04B 11/00; H04B 10/00; H04W 4/40; H04W 4/38; G06K 9/6256
USPC ........................................ 340/12.5
See application file for complete search history.

(56) References Cited

U.S. PATENT DOCUMENTS

| | | |
|---|---|---|
| 5,181,423 A | 1/1993 | Philipps et al. |
| 10,055,618 B1* | 8/2018 | Dalgleish ........... G06K 7/10316 |
| 2002/0129633 A1 | 9/2002 | Joki et al. |
| 2013/0211761 A1* | 8/2013 | Brandsma .............. G01D 21/00 702/85 |
| 2014/0232519 A1* | 8/2014 | Allen ..................... G06Q 10/08 340/5.9 |

FOREIGN PATENT DOCUMENTS

| | | |
|---|---|---|
| DE | 102009047405 A1 | 6/2011 |
| DE | 102013113258 A1 | 6/2015 |

* cited by examiner

*Primary Examiner* — Vernal U Brown
(74) *Attorney, Agent, or Firm* — Mark A. Logan; Endress+Hauser (USA) Holding Inc.

(57) ABSTRACT

A sensor system comprises a first mobile sensor unit and a stationary sensor unit. The first mobile sensor unit has a first sensor for acquiring a first measured value and a first wireless communication unit for receiving a calibration value and for transmitting the first measured value. The stationary sensor unit has a second sensor for acquiring a second measured value and a second wireless communication unit for transmitting the calibration value and for receiving the first measured value.

7 Claims, 2 Drawing Sheets

SENSOR SYSTEM FOR MOBILE ACQUISITION OF AT LEAST ONE MEASURED VALUE AND MEASURING METHOD FOR SUCH A SENSOR SYSTEM

CROSS-REFERENCE TO RELATED APPLICATION

The present application is related to and claims the priority benefit of German Patent Application No. 10 2019 127 380.3, filed on Oct. 10, 2019, the entire contents of which are incorporated herein by reference.

TECHNICAL FIELD

The present disclosure relates to a sensor system for the mobile acquisition of at least one measured value and to a measuring method for such a sensor system.

BACKGROUND

In analytical measurement technology, especially in the fields of water management and environmental analysis and in industry, for example in food technology, biotechnology and pharmaceuticals, as well as for various laboratory applications, measurands such as pH value, conductivity or the concentration of analytes such as ions or dissolved gases in a gaseous or liquid measurement medium are of great importance. These measurands can be detected and/or monitored by means of, for example, electrochemical sensors, such as potentiometric, amperometric, voltammetric, or coulometric sensors, or conductivity sensors, which are all known per se from the prior art.

Cell culture measurements having individual reference sensors are especially challenging in biotechnology, because the cell density and thus the medium density can change by several orders of magnitude over the course of the reaction time. This results in bubble inclusions and a heterogeneous state of the medium. Chemical parameters, such as pH, DO, glucose and cell density, as well as physical parameters, such as temperatures, can be very different locally. For a reliable checking of the cell culture, however, measurement data throughout the cell culture volume are of interest.

Mobile sensor units which enable a mobile measurement of parameters in an entire process volume are known from the prior art, for example from DE 6 2009 047 405 A1 or DE 6 208 217 342 A1.

However, mobile sensor units have the disadvantage that a drift which occurs at the sensor and which is caused, for example, by permanently high temperatures, for example above 15° C., and simultaneous flashing of the sensor, essentially photobleaching and leaching, may be more difficult to correct than is the case with stationary sensors. This is due to the free movement of the mobile sensor units within the process medium.

SUMMARY

It is therefore an object of the present disclosure to provide a measuring method which enables a reliable measurement in a process volume.

The sensor system according to the present disclosure comprises at least one first mobile sensor unit and at least one stationary sensor unit. The first mobile sensor unit has a first sensor for acquiring a first measured value and a first wireless communication unit for receiving a calibration value and for transmitting the first measured value.

The stationary sensor unit has a second sensor for acquiring a second measured value and a second wireless communication unit for transmitting the calibration value and for receiving the first measured value.

The sensor system according to the present disclosure makes it possible for the mobile sensor unit to be calibrated at regular intervals. It thus becomes possible to correct the drift of the mobile sensor unit.

In accordance with one embodiment of the present disclosure, the stationary sensor unit has a computing unit. The stationary sensor unit is connected to the second sensor and to the second wireless communication unit. The computing unit is suitable for calculating the calibration value on the basis of the second measured value or on the basis of the first measured value and the second measured value.

In accordance with one embodiment of the present disclosure, the stationary sensor unit has a second mobile sensor unit with a third sensor and a third wireless communication unit. The third sensor is suitable for acquiring a third measured value, and the third wireless communication unit is suitable for receiving the calibration value and the second measured value and for transmitting the calibration value, the second measured value and the third measured value. The second wireless communication unit is suitable for receiving the third measured value and for transmitting the calibration value and the third measured value.

According to one embodiment of the present disclosure, the stationary sensor unit has a fourth wireless communication unit for transmitting the calibration value and for receiving the first measured value. The fourth wireless communication unit is spaced apart from the second wireless communication unit.

The method according to the present disclosure for the mobile acquisition of at least one measured value comprises at least the following steps:
  providing a sensor system according to the present disclosure,
  transmitting a calibration value from the stationary sensor unit to the first mobile sensor unit via the second wireless communication unit of the stationary sensor unit and the first wireless communication unit of the first mobile sensor unit,
  calibrating the first mobile sensor unit on the basis of the received calibration value,
  acquiring the first measured value via the first mobile sensor unit,
  transmitting the first measured value via the first wireless communication unit of the first mobile sensor unit to the second wireless communication unit of the stationary sensor unit.

According to one embodiment of the present disclosure, before the step of transmitting a calibration value from the stationary sensor unit to the first mobile sensor unit, the measuring method comprises the following steps:
  acquiring a first measured value by the first sensor of the first mobile sensor unit,
  transmitting the first measured value via the first wireless communication unit of the first mobile sensor unit to the second wireless communication unit of the stationary sensor unit,
  acquiring the second measured value via the second sensor of the stationary sensor unit,
  determining a calibration value on the basis of the first measured value and the second measured value.

According to one embodiment of the present disclosure, the sensor system comprises at least one second mobile sensor unit having a third sensor and a third wireless communication unit, and the measuring method further comprises the following steps:

transmitting the calibration value from the first mobile sensor unit to the second mobile sensor unit via the first wireless communication unit of the first mobile sensor unit and the third wireless communication unit of the second mobile sensor unit, calibrating the second mobile sensor unit on the basis of the received calibration value.

According to one embodiment of the present disclosure, the measuring method further comprises the following steps:

acquiring a second measured value via the second sensor of the first mobile sensor unit, transmitting the second measured value from the second mobile sensor unit to the first mobile sensor unit via the third wireless communication unit of the second mobile sensor unit and the first wireless communication unit of the first mobile sensor unit, transmitting the second measured value from the first mobile sensor unit to the stationary sensor unit via the first wireless communication unit of the first mobile sensor unit and the second wireless communication unit of the stationary sensor unit.

According to one embodiment of the present disclosure, the measuring method further comprises the following steps:

determining a primary mobile sensor unit which is closest to the stationary sensor unit, determining a secondary mobile sensor unit which is closest to the primary mobile sensor unit. The step of transmitting a calibration value is from the primary mobile sensor unit to the secondary mobile sensor unit. The step of transmitting a second measured value is from the secondary mobile sensor unit to the primary mobile sensor unit.

The mobile sensor unit according to the present disclosure comprises a first sensor for acquiring a first measured value and a first wireless communication unit having a transmitting module for transmitting the first measured value and a receiving module for receiving a calibration value. The wireless communication unit is designed as an acoustic communication unit or as an optical communication unit.

BRIEF DESCRIPTION OF THE DRAWINGS

The present disclosure will be explained in more detail on the basis of the following description of the figure. The following are shown.

DETAILED DESCRIPTION

Figure 1:
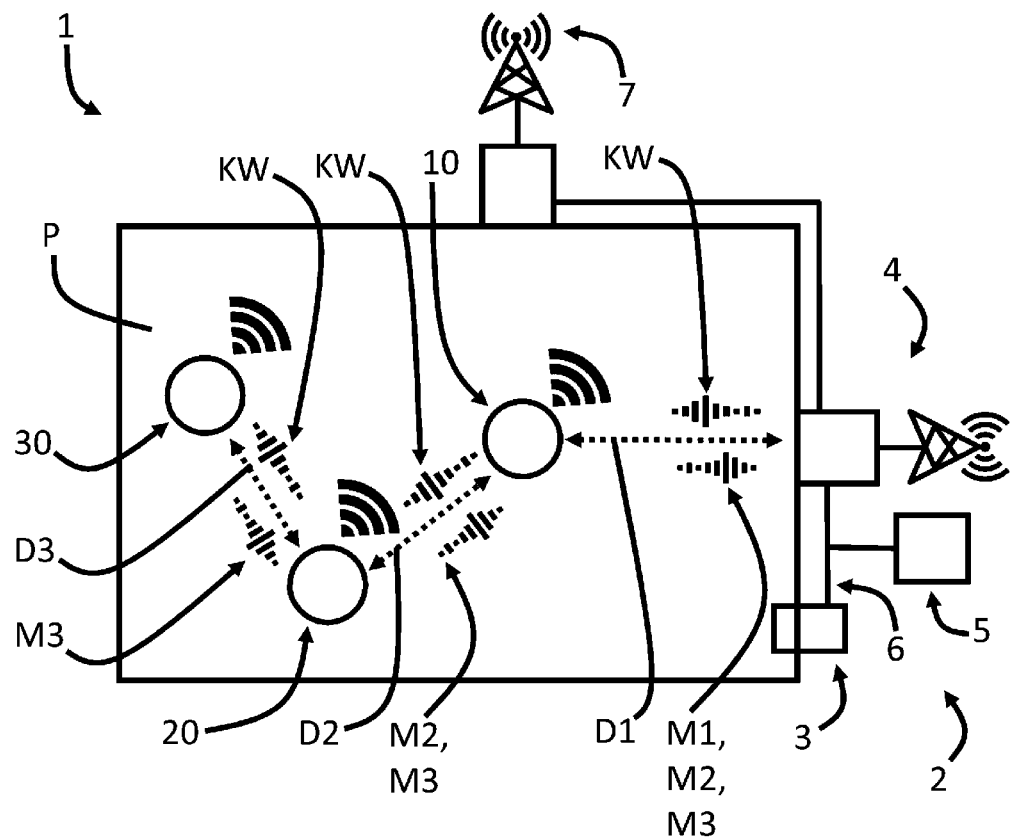
FIG. 1 shows a schematic view of a sensor system according to the present disclosure.

FIG. 1 shows a sensor system 1 for the mobile acquisition of at least one measured value in a process medium P. The sensor system 1 comprises a first mobile sensor unit 10, a second mobile sensor unit 20, a third mobile sensor unit 30 and a stationary sensor unit 2. In an alternative embodiment, the sensor system 1 may also comprise only one mobile sensor unit or more than three mobile sensor units.

The mobile sensor units 10, 20, 30 are preferably all of identical design. For this reason, in the description, like elements are used by reference numerals having the same units digit and having a tens digit specific to the respective sensor unit. For the sake of simplicity, only the first mobile sensor unit 10 will be described in detail below.

The first mobile sensor unit 10 has a first sensor 11 for acquiring a first measured value M1, and a first wireless communication unit 12. The first sensor 11 is, for example, an optical pH sensor or an optical oxygen sensor.

The first wireless communication unit 12 is suitable for transmitting and receiving signals. For example, the first wireless communication unit 12 is suitable for transmitting the first measured value M1 and for receiving a calibration value KW. The first measured value M1 is, for example, a chemical parameter or a physical parameter. The calibration value KW will be discussed later.

Figure 2:
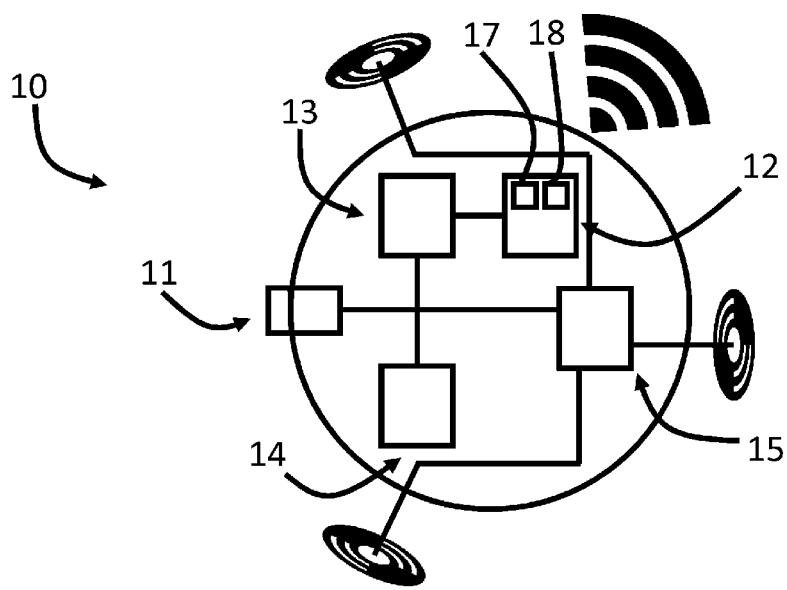
FIG. 2 shows a schematic view of a mobile sensor unit according to the present disclosure.

As shown in FIGS. 1 and 2, the first mobile sensor unit 10 preferably has a spherical shape. This shape makes it possible to achieve advantageous flow properties in the process medium.

The first mobile sensor unit 10 further comprises an energy module 13 for storing electrical energy, for example a battery, wherein the energy module 13 is connected to the first sensor 5 and the first wireless communication unit 12. The energy module 13 optionally comprises an energy converter 14, for example a turbine, a generator with flywheel or a wireless charging module. The energy converter 14 makes it possible, for example, to recharge the battery.

The first wireless communication unit 12 comprises a transmitting module 17 for transmitting the first measured value M1 and a receiving module 18 for receiving the calibration value KW. For example, the wireless communication unit 12 is designed as an acoustic communication unit or as an optical communication unit.

In the case of an acoustic communication unit, the transmitting module 17 is a sound emitter and the receiving module 18 is a sound receiver. The sound emitter is, for example, a PZT (lead zirconate titanate) ceramic in disk form, which expands in the direction of the disk radius as a function of an electrically applied voltage. These disks are advantageously applied to an elastic process-medium-contacting part of the first mobile sensor unit 10 e.g. by adhesive bonding, so that when the piezoelectric disk expands or contracts, a bimetal effect is developed, which results in a curvature of the disk and thus to a sound transmission into the process medium. The advantage of such a structure is that it is possible to work with small voltage levels. Acoustic frequencies in the range of approximately 5 kHz are advantageously used and a mechanical resonance frequency of the oscillatory system, i.e. the piezoelectric disk, is used for the transmission.

In the case of an optical communication unit, the transmitting module 17 is a light source, for example a laser light source, and the receiving module 18 is an optical sensor, for example a CMOS camera or a CCD camera.

In one embodiment, the first mobile sensor unit 10 comprises a drive 15. The drive 15 is connected to the energy module 13 and comprises, for example, at least one motor and at least one propeller or screw, or another module for converting stored energy into kinetic energy. The drive 15 allows the first mobile sensor unit 10 to move in the process medium. The first mobile sensor unit 10 can thus be purposefully moved to predetermined positions in the process medium.

The first mobile sensor unit 10 further comprises an immersion chamber (not shown) which can be partially filled with process medium so that the mobile sensor unit 10 is located at a predetermined depth in the process medium.

If the process medium is a liquid, the drive 15 will comprise a screw and the mobile sensor unit 10 will float on or be submerged in the process medium. If the process medium is a gas, the drive 15 will comprise a propeller and the mobile sensor unit 10 will float in the process medium.

The stationary sensor unit 2 shown in FIG. 1 comprises a second sensor 3 and a second wireless communication unit 4. Furthermore, the stationary sensor unit 2 has a computing unit 5 which is connected to the second sensor 3 and the second wireless communication unit 4.

The second sensor 3 is suitable for acquiring a second measured value M2. The second measured value M2 is preferably the same chemical or physical parameter as in the case of the first measured value M1 measured by the first sensor 11 of the first mobile sensor unit 10.

The second wireless communication unit 4 is suitable for communicating with the first wireless communication unit 12 of the first mobile sensor unit 10 or the second mobile sensor unit 20 or the third mobile sensor unit 30. The second wireless communication unit 4 is suitable for transmitting the calibration value KW to the first mobile sensor unit 10, more precisely to the first wireless communication unit 12 of the first mobile sensor unit 10. The second wireless communication unit 4 is of a type identical to the first wireless communication unit 12. This means that if the first wireless communication unit 12 is designed, for example, as an acoustic communication unit, the second wireless communication unit 4 will also be an acoustic communication unit.

The computing unit 5 is suitable for storing the calibration value KW. The computing unit 5 is furthermore suitable for calculating the calibration value KW based on the second measured value M2 or based on the first measured value M1 received via the second wireless communication unit 4 and the second measured value M2. The advantage of the calibration value KW, which was calculated on the basis of the first measured value M1 and the second measured value M2, is that, when the first mobile sensor unit 10 is located in the vicinity of the stationary sensor unit 2, the calibration value KW can be determined and can be used for a very accurate calibration of the first mobile sensor unit 10.

In the embodiment shown in FIG. 1, the stationary sensor unit 3 comprises a third wireless communication unit 7 which is connected to the computing unit 5. In an alternative embodiment, the stationary sensor unit 3 comprises further wireless communication units or only the second wireless communication unit 4. The third wireless communication unit 7 is suitable for receiving the first measured value M1 of the first mobile sensor unit 10. The communication units are preferably identical, i.e. each communication unit has a sensor (not shown). Alternatively, only one communication unit has a sensor (see FIG. 1).

The third wireless communication unit 7 is spaced apart from the second wireless communication unit 4. Due to the distance between the second wireless communication unit 4 and the third wireless communication unit 7, the signal transmitted from the first mobile sensor unit 10, i.e., the first measured value M1, is received at two different positions by the wireless communication units 4, 7.

On the basis of the received signal of the first measured value M1, which was received at the second wireless communication unit 4, and on the basis of the received signal of the first measured value M1, which was received at the third wireless communication unit 7, the computing unit 5 is suitable for determining a position determination of the first mobile sensor unit 10, e.g. by triangulation. To this end, the computing unit 5 evaluates especially the signal strength and the time offset of the received signal of the first measured value M1 at the second wireless communication unit 4 and at the third wireless communication unit 7. If the stationary sensor unit 2 has more than two wireless communication units, the position determination will function correspondingly more accurately or, in the case of fewer than two wireless communication units, correspondingly more inaccurately. The same type of position determination is used for determining the position of the second and third mobile sensor units 20, 30.

In one embodiment, the computing unit 5 has a memory in which the computing unit 5 stores data. The stored data are, for example, position data, measurement data and calibration data. This embodiment has the advantage that the stored data may also be read out by a user in a manner other than via the second wireless communication unit 4.

As mentioned above, in the embodiment shown in FIG. 1 the sensor system 1 has a second mobile sensor unit 20 and a third mobile sensor unit 30, each having a sensor 25, 35 and a wireless communication unit 27, 37.

The wireless communication units 17, 27, 37 are suitable for transmitting measured values M1, M2, M3 and receiving them from a mobile sensor unit 10, 20, 30 in order to relay them to another mobile sensor unit 10, 20, 30 or ultimately to the stationary sensor unit 2. The wireless communication units 17, 27, 37 are also suitable for receiving the calibration value KW from the stationary sensor unit 2 or from a mobile sensor unit 10, 20, 30 and transmitting it to a mobile sensor unit 10, 20, 30, so that the calibration value KW is available to each mobile sensor unit 10, 20, 30. This makes it possible, when the mobile sensor units 10, 20, 30 are distributed in the medium, for a kind of chain to be formed for data transmission between the different mobile sensor units 10, 20, 30 in order to relay signals, i.e. measured values M1, M2, M3 and/or the calibration value KW with minimum signal intensity.

Of course, the sensors 3, 11, 21, 31 described above may also include additional sensors for acquiring other parameters. For example, the sensor may comprise a temperature sensor, pressure sensor, viscosity sensor or other sensors. The measured value M1, M2, M3 determined by the sensors may thus also comprise further measured values relating to different measurement parameters, such as temperature, pressure, viscosity or other parameters.

Figure 3:
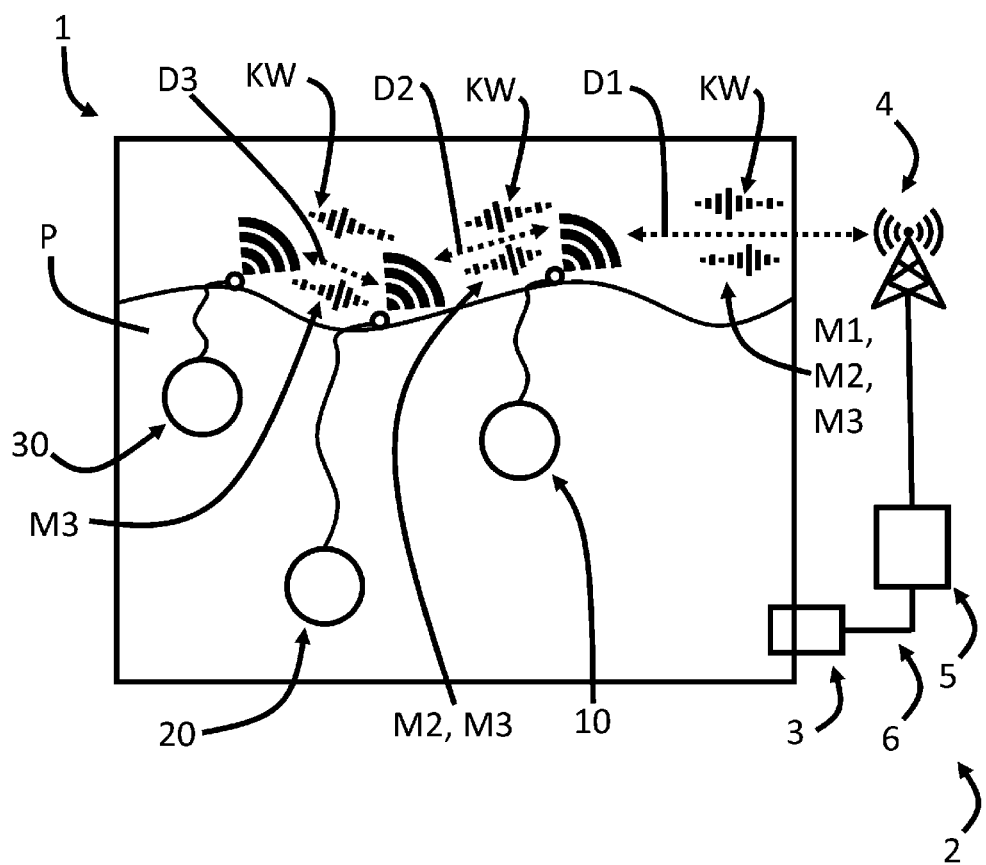
FIG. 3 shows a schematic view of an embodiment of a sensor system according to the present disclosure.

In the exemplary embodiment shown in FIG. 3, the mobile sensor units 10, 20, 30 have an antenna 16, 26, 36 with a part floating on the surface of a liquid process medium. This embodiment is suitable for transmitting radio signals via the antenna 16, 26, 36. The radio signals may be received by the antennas 16, 26, 36 of the mobile sensor units 10, 20, 30 and the stationary sensor unit 2. In this case, the wireless communication unit 12 is a radio unit.

The measurement method of the sensor system 1 for mobile acquisition of at least one measured value is described below.

In a first implicit step, the sensor system 1 is provided. This means, for example, that all components of the sensor system 1 are ready for measuring or for communicating.

A step of transmitting the calibration value KW from the stationary sensor unit 2 to the first mobile sensor unit 10 is then carried out and is performed by the second wireless communication unit 4 of the stationary sensor unit 2 and the first wireless communication unit 12 of the first mobile sensor unit 10. The calibration value KW is stored for example by the user of the sensor system 1 in the stationary sensor unit 2. For example, the calibration value KW is stored in a memory of the sensor unit 2. Alternatively, the calibration value KW is determined by the stationary sensor unit 2 before the transmission step.

In an alternative embodiment, the calibration value KW based on an average value of measured values of different sensors is determined by different stationary sensor units.

The first mobile sensor unit 10 is then calibrated on the basis of the received calibration value KW. This makes it possible to correct the measured value M1 determined by the first sensor 11 when there is a drift of the first sensor 11.

Next, the first measured value M1 is acquired by the first mobile sensor unit 10. The acquired measured value M1 is, for example, a chemical or a physical parameter of the process medium P.

The first measured value M1 is subsequently transmitted via the first wireless communication unit 12 of the first mobile sensor unit 10 to the second wireless communication unit 4 of the stationary sensor unit 2. Thanks to the preset calibration, the transmitted measured value M1 is a very accurate measured value of the process medium P.

In an embodiment compatible with the above-described measurement method, before the step of transmitting a calibration value KW from the stationary sensor unit 2 to the first mobile sensor unit 10, the following steps are executed:

A first measured value M1 is acquired by the first sensor 5 of the first mobile sensor unit 10 and transmitted via the first wireless communication unit 12 of the first mobile sensor unit 10 to the second wireless communication unit 4 of the stationary sensor unit 2. A second measured value M2 is then detected by the second sensor 3 of the stationary sensor unit 2. A calibration value KW based on the first measured value M1 and the second measured value M2 is then determined.

If the sensor system 1 comprises, as shown in FIG. 1, a second mobile sensor unit 20 having a third sensor 25 and a third wireless communication unit 27, the measurement method will further comprise the following steps:

The calibration value KW is transmitted from the first mobile sensor unit 10 to the second mobile sensor unit 20 via the first wireless communication unit 12 of the first mobile sensor unit 10 and the third wireless communication unit 27 of the second mobile sensor unit 20. The second mobile sensor unit 20 is calibrated on the basis of the received calibration value KW. In the case of a plurality of mobile sensor units, the calibration value KW is thus passed between the mobile sensor units 10, 20, 30. This makes it possible, above all, for mobile sensor units which are far away from the stationary sensor unit 2 or are outside the transmitter range of the stationary sensor unit 2 to receive the calibration value KW communicated via more closely situated mobile sensor units.

Behavior is similar in the communication of the measured values of the mobile sensor units which are located far away from the stationary sensor unit 2. In this case, the measured value M2, M3 determined by the mobile sensor unit 20, 30 is forwarded to the next mobile sensor unit. This in turn also forwards the received measured values to the nearest mobile sensor unit or to the stationary sensor unit 2.

In one embodiment of the measuring method, a so-called transmission chain is first defined before the transmission of calibration values or measured values. The transmission chain allows data to be efficiently exchanged between the mobile sensor units 10, 20, 30 and the stationary transmitting unit 2.

For this purpose, a primary mobile sensor unit 10' is determined which is closest to the stationary sensor unit 2. This can be done, for example, by classifying the signal strength of the signals transmitted by the mobile sensor units 10, 20, 30 and received at the stationary sensor unit.

A secondary mobile sensor unit 20' which is closest to the primary mobile sensor unit 10' is then determined. This step can also be carried out by classifying the signal strength of the signals transmitted by the mobile sensor units 10, 20, 30 and received at the stationary sensor unit. Alternatively, this step may be performed by classifying the signal strength of the signals transmitted by the mobile sensor units and received at the primary mobile sensor unit 10'. In further mobile sensor units, the classification is performed in the same way. A sequence of signal propagation is thus determined.

If the transmission chain is stationary, the step will take place of transmitting the calibration value KW from the stationary sensor unit 2 to the primary mobile sensor unit 10' and to the secondary mobile sensor unit 20'.

While the measured values are being transmitted, forwarding is performed in the reverse direction. The second measured value M2 of the secondary mobile sensor unit 20' is communicated to the primary mobile sensor unit 10', and the primary mobile sensor unit 10' forwards the second measured value M2 to the stationary sensor unit 2.

If the sensor 3 of the stationary sensor unit 2 or the sensor 11 of the first mobile sensor unit 10 or the sensor 21 of the second mobile sensor unit 20 is an optical pH sensor, then a sample calibration or single-point calibration will be performed during the calibration. In this case, calibration points lie within the measured value marginal range. The pH values are thus, for example, pH 4 or pH 10, i.e. within a strongly acidic or strongly basic range. The calibration points also depend on the ionic strength of the process medium. The calibration corrects a change in measured value which occurs over time as a result of sensor drift. This correction is performed by calibration or adjustment of the mobile sensor units.

In an alternative variant, the sensors 3, 11, 21, 31 can be calibrated in a naturally occurring stable state of the process medium. For example, when the process medium reaches a predetermined, i.e. a chemically-induced, stable pH during fermentation.

In an alternative variant, the sensors 3, 11, 21, 31 can be calibrated by means of a two-point calibration. This is done, for example, by introducing phosphoric acid into the process and subsequently introducing ammonia into the process. The sensors 3, 11, 21, 31 thus measure two different media with known chemical or physical parameters.

If the sensor 3 of the stationary sensor unit 2 or the sensor 11 of the first mobile sensor unit 10 or the sensor 21 of the second mobile sensor unit 20 is an oxygen sensor, then preferably a sample calibration will take place during the calibration, i.e., during a stable state of the process medium. This stable state is achieved by supplying or discharging gases into the process medium. For example, the stable state of 0% oxygen is achieved by gassing the process medium with argon/nitrogen. The stable state of 100% oxygen in the process medium is achieved, for example, by gassing the process medium with an air-saturated solution. In the case of an oxygen sensor, a 2-point calibration is thus implemented.

In one embodiment of the measuring method, the computing unit 5 generates statistics about all measured values M1, M2, M3 received by the mobile sensor units 10, 20, 30 and correlates these with the position data of the mobile sensor units 10, 20, 30. This enables the user to evaluate the process medium three-dimensionally.

The invention claimed is:

1. A sensor system for mobile acquisition of at least one measured value in a process medium, comprising:
   a first mobile sensor unit; and a stationary sensor unit;

wherein the first mobile sensor unit includes a first sensor for acquiring a first measured value and a first wireless communication unit for receiving a calibration value and for transmitting the first measured value, and wherein the stationary sensor unit includes a second sensor for acquiring a second measured value and a second wireless communication unit for transmitting the calibration value and for receiving the first measured value, wherein the stationary sensor unit has a second mobile sensor unit with a third sensor and a third wireless communication unit, wherein the third sensor is suitable for acquiring a third measured value, and the third wireless communication unit is suitable for receiving the calibration value and the second measured value and for transmitting the calibration value, the second measured value, and the third measured value, wherein the second wireless communication unit is suitable for receiving the third measured value and for transmitting the calibration value and the third measured value.

2. The sensor system according to claim 1, wherein the stationary sensor unit further includes a computing unit connected to the second sensor and to the second wireless communication unit, wherein the computing unit is suitable for calculating the calibration value on the basis of the second measured value or on the basis of the first measured value and the second measured value.

3. The sensor system according to claim 1, wherein the stationary sensor unit further includes a fourth wireless communication unit for transmitting the calibration value and for receiving the first measured value, wherein the fourth wireless communication unit is spaced apart from the second wireless communication unit.

4. A measuring method of a sensor system for the mobile acquisition of at least one measured value, the method comprising:

providing the sensor system, including:
a first mobile sensor unit;
a second mobile sensor unit; and
a stationary sensor unit;
wherein the first mobile sensor unit includes a first sensor for acquiring a first measured value and a first wireless communication unit for receiving a calibration value and for transmitting the first measured value,
wherein the stationary sensor unit includes a second sensor for acquiring a second measured value and a second wireless communication unit for transmitting the calibration value and for receiving the first measured value, and
wherein the second mobile sensor unit includes a third sensor and a third wireless communication unit;

transmitting the calibration value from the stationary sensor unit to the first mobile sensor unit via the second wireless communication unit of the stationary sensor unit and the first wireless communication unit of the first mobile sensor unit;

calibrating the first mobile sensor unit on the basis of the received calibration value;

acquiring the first measured value via the first mobile sensor unit;

transmitting the first measured value via the first wireless communication unit of the first mobile sensor unit to the second wireless communication unit of the stationary sensor unit;

transmitting the calibration value from the first mobile sensor unit to the second mobile sensor unit via the first wireless communication unit of the first mobile sensor unit and the third wireless communication unit of the second mobile sensor unit; and calibrating the second mobile sensor unit on the basis of the received calibration value.

5. The measuring method according to claim 4, wherein before the step of transmitting a calibration value from the stationary sensor unit to the first mobile sensor unit, the measuring method further comprises:

acquiring the first measured value via the first sensor of the first mobile sensor unit;

transmitting the first measured value via the first wireless communication unit of the first mobile sensor unit to the second wireless communication unit of the stationary sensor unit;

acquiring the second measured value via the second sensor of the stationary sensor unit; and determining the calibration value based on the first measured value and the second measured value.

6. The measuring method according to claim 4, further comprising:

acquiring a second measured value via the second sensor of the first mobile sensor unit;

transmitting the second measured value from the second mobile sensor unit to the first mobile sensor unit via the third wireless communication unit of the second mobile sensor unit and the first wireless communication unit of the first mobile sensor unit; and transmitting the second measured value from the first mobile sensor unit to the stationary sensor unit via the first wireless communication unit of the first mobile sensor unit and the second wireless communication unit of the stationary sensor unit.

7. The measuring method according to claim 6, further comprising:

determining a primary mobile sensor unit which is closest to the stationary sensor unit;

determining a secondary mobile sensor unit which is closest to the primary mobile sensor unit;

transmitting the calibration value from the primary mobile sensor unit to the secondary mobile sensor unit; and transmitting the second measured value from the secondary mobile sensor unit to the primary mobile sensor unit.

* * * * *